(12) United States Patent
Moscato et al.

(10) Patent No.: US 10,309,814 B2
(45) Date of Patent: Jun. 4, 2019

(54) METHODS AND APPARATUS FOR DETERMINING DOWNHOLE FLUID PARAMETERS

(71) Applicant: Schlumberger Technology Corporation, Sugar Land, TX (US)

(72) Inventors: Tullio Moscato, Paris (FR); Elena Borisova, Paris (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 334 days.

(21) Appl. No.: 14/397,643

(22) PCT Filed: May 17, 2013

(86) PCT No.: PCT/IB2013/054056
§ 371 (c)(1),
(2) Date: Oct. 28, 2014

(87) PCT Pub. No.: WO2013/171721
PCT Pub. Date: Nov. 21, 2013

(65) Prior Publication Data
US 2015/0135817 A1 May 21, 2015

Related U.S. Application Data

(60) Provisional application No. 61/648,841, filed on May 18, 2012.

(51) Int. Cl.
*G01F 1/00* (2006.01)
*G01F 1/68* (2006.01)
(Continued)

(52) U.S. Cl.
CPC .............. *G01F 1/684* (2013.01); *E21B 47/00* (2013.01); *E21B 47/065* (2013.01);
(Continued)

(58) Field of Classification Search
CPC ........ G01F 1/684; G01F 1/6888; G01F 1/688; E21B 47/1005
See application file for complete search history.

(56) References Cited

U.S. PATENT DOCUMENTS 4,079,626 A * 3/1978 Gardner .................... G01F 1/58
73/181
4,110,229 A * 8/1978 Carlin .................... C09K 8/584
166/270.1
(Continued)

FOREIGN PATENT DOCUMENTS

WO 2006/004740 1/2006

OTHER PUBLICATIONS

Examination Report issued in GCC Patent Appl. No. GC 2013-24423 dated Feb. 27, 2018; 4 pages.
(Continued)

*Primary Examiner* — Paul M. West

(57) ABSTRACT

Example methods and apparatus to determine downhole fluid parameters are disclosed herein. An example method includes determining a velocity of a portion of a downhole tool moving in a well and determining a response of a fluid sensor disposed on the portion of the downhole tool. The fluid sensor includes a resistance temperature detector at least partially immersed in a fluid in the well. The example method further includes determining a velocity of the fluid based the velocity of the portion of the downhole tool and the response of the fluid sensor.

19 Claims, 6 Drawing Sheets

(51) Int. Cl.
  *E21B 47/00*     (2012.01)
  *E21B 47/06*     (2012.01)
  *E21B 47/10*     (2012.01)
  *G01F 1/684*     (2006.01)
  *G01F 1/688*     (2006.01)

(52) U.S. Cl.
  CPC ............ *E21B 47/1005* (2013.01); *G01F 1/00* (2013.01); *G01F 1/68* (2013.01); *G01F 1/688* (2013.01); *G01F 1/6888* (2013.01)

(56) References Cited

U.S. PATENT DOCUMENTS

| | | | | |
|---|---|---|---|---|
| 4,662,218 | A * | 5/1987 | Hawthorne | E21B 47/10 250/260 |
| 4,947,683 | A | 8/1990 | Minear et al. | |
| 4,986,122 | A | 1/1991 | Gust | |
| 6,208,254 | B1 * | 3/2001 | McQueen | G01F 1/684 340/603 |
| 6,553,828 | B1 * | 4/2003 | Thurmond | G01P 5/10 73/204.16 |
| 2009/0084546 | A1 * | 4/2009 | Ekseth | E21B 47/04 166/255.1 |
| 2011/0011174 | A1 * | 1/2011 | Boe | E21B 43/12 73/152.18 |
| 2011/0315375 | A1 | 12/2011 | Moscato et al. | |

OTHER PUBLICATIONS

Examination Report issued in GCC Patent Appl. No. GC 2013-24423 dated Aug. 2, 2018; 3 pages.

\* cited by examiner

METHODS AND APPARATUS FOR DETERMINING DOWNHOLE FLUID PARAMETERS

FIELD OF THE DISCLOSURE

This disclosure relates generally to downhole fluids and, more particularly, to methods and apparatus for determining downhole fluid parameters.

BACKGROUND

Spinner flowmeters generally include a spinner or impeller, which may rotate when a fluid flows past the spinner. Based on a speed of rotation of the spinner, a velocity of the fluid may be determined. However, friction and/or fluid viscosity prevents the fluid from rotating the spinner if the velocity of the fluid is below a threshold value. Further, particulates and/or debris in the fluid may obstruct the rotation of the spinner and/or prevent or hinder fluid from flowing past the spinner, thereby preventing or hindering fluid velocity measurements via the spinner flowmeter. If the fluid is a multiphase fluid, a response of a spinner flowmeter is often unrepresentative of the fluid velocity.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

An example method disclosed herein includes determining a velocity of a portion of a downhole tool moving in a well and determining a response of a fluid sensor disposed on the portion of the downhole tool. The fluid sensor includes a resistance temperature detector at least partially immersed in a fluid in the well. The example method further includes determining a velocity of the fluid based the velocity of the portion of the downhole tool and the response of the fluid sensor.

Another example method disclosed herein includes determining a direction of fluid flow in a well relative to a portion of a downhole tool moving in the well via a fluid sensor disposed on the downhole tool. The fluid sensor is capable of sensing fluid flow of about five millimeters per second or greater. The example method further includes determining a velocity of the fluid based the direction of the fluid flow relative the portion of the downhole tool.

Another example method disclosed herein includes determining a direction of flow of a fluid mixture in a fluid flow passageway and moving a fluid sensor disposed in the fluid mixture based on the direction of the flow of the fluid mixture. The example method also includes determining a velocity of the fluid sensor and determining a direction of flow of the fluid mixture relative to the fluid sensor. The example method further includes determining a velocity of the fluid mixture based on the direction of the flow of the fluid mixture relative to the fluid sensor and the velocity of the fluid sensor.

BRIEF DESCRIPTION OF THE DRAWINGS

Embodiments of methods and apparatus for determining downhole fluid parameters are described with reference to the following figures. The same numbers are used throughout the figures to reference like features and components.

DETAILED DESCRIPTION

Figure 1:
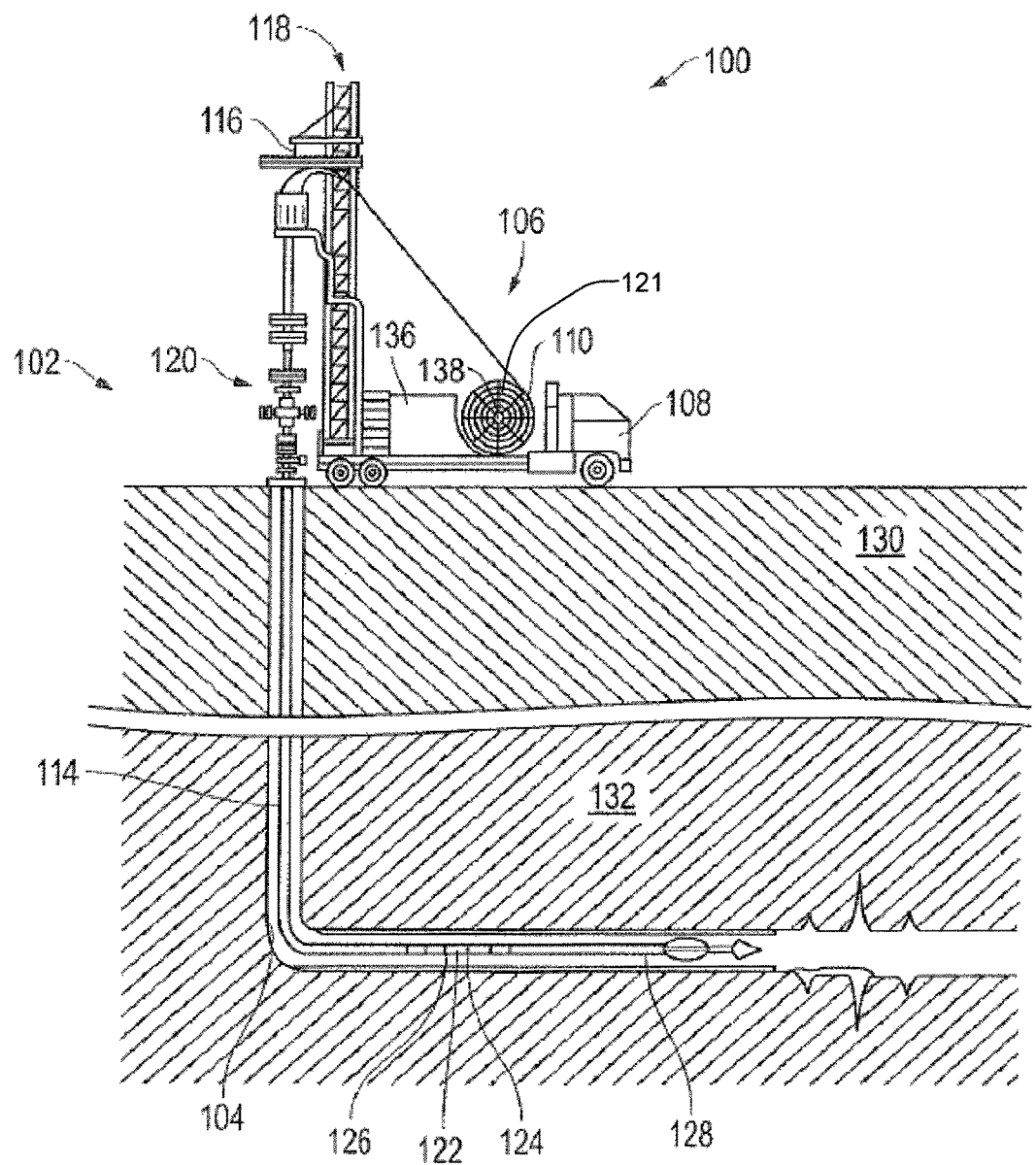
FIG. 1 illustrates an example system in which embodiments of methods and apparatus for determining downhole fluid parameters can be implemented.

It is to be understood that the following disclosure provides many different embodiments or examples for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features such that the first and second features may not be in direct contact.

Example methods and apparatus for determining downhole fluid parameters are disclosed herein. Some example methods disclosed herein may be used to determine a velocity of a fluid when a downhole tool is moving in a well. An example method disclosed herein may include disposing the downhole tool in the well and immersing at least a portion of the downhole tool in the fluid. In some examples, the fluid is a fluid mixture such as, for example, a multi-phase fluid.

In some examples, a direction of flow of the fluid may be determined, and the downhole tool may be moved based on the direction of the flow of the fluid. For example, the downhole tool may be moved in the same direction as the flow of the fluid. In some examples, movement of the downhole tool is accelerated from a velocity less than the velocity of the fluid to a velocity greater than the velocity of the fluid. In some examples, when the downhole tool is moving, a velocity of a portion of the downhole tool may be determined and a velocity of the fluid relative to the portion of the downhole tool (i.e., a relative fluid velocity) may be determined. In some examples, a direction of the fluid flow relative to the portion of the downhole tool (i.e., a relative fluid flow direction) is determined. In some examples, the relative fluid velocity and/or the relative fluid flow direction is determined via a fluid sensor including a resistance temperature detector. Based on the velocity of the portion of the downhole tool and the relative fluid velocity and/or the relative fluid flow direction, the velocity of the fluid may be determined.

FIG. 1 is a schematic depiction of a wellsite 100 with a coiled tubing system 102 deployed into a well 104. The coiled tubing system 102 includes surface delivery equipment 106, including a coiled tubing truck 108 with reel 110, positioned adjacent the well 104 at the wellsite 100. The coiled tubing system 102 also includes coiled tubing 114 that may be used to pump a fluid into the well 104. With the coiled tubing 114 run through a conventional gooseneck injector 116 supported by a mast 118 over the well 104, the coiled tubing 114 may then be advanced into the well 104. That is, the coiled tubing 114 may be forced down through valving and pressure control equipment 120 and into the well 104. In some examples, the surface delivery equipment 106 includes a measuring wheel 121 to determine a velocity at which the coiled tubing 114 is deployed into the well 104.

In the coiled tubing system 102 as shown, a treatment device 122 is provided for delivering fluids downhole during a treatment application. The treatment device 122 is deployable into the well 104 to carry fluids, such as an acidizing agent or other treatment fluid, and disperse the fluids through at least one injection port 124 of the treatment device 122.

The coiled tubing system 102 of FIG. 1 is depicted as having a fluid sensing system 126 positioned about the injection port 124 for determining parameters of fluids in the well 104. The fluid sensing system 126 is configured to determine fluid parameters, such as fluid direction and/or velocity. Other downhole parameters may also be determined, if desired.

Continuing with reference to FIG. 1, the coiled tubing system 102 may optionally be provided with a logging tool 128 for collecting downhole data. The logging tool 128 as shown is provided near a downhole end of the coiled tubing 114. The logging tool 128 is configured to acquire a variety of logging data from the well 104 and surrounding formation layers 130, 132, such as those depicted in FIG. 1. The logging tool 128 is provided with a host of well profile generating equipment or implements configured for production logging directed at acquiring well fluids and formation measurements from which an overall production profile may be developed. Other logging, data acquisition, monitoring, imaging and/or other devices and/or capabilities may be provided to acquire data relative to a variety of well characteristics. Information gathered may be acquired at the surface in a high speed manner, and, where appropriate, put to immediate real-time use (e.g. via a treatment application).

With reference still to FIG. 1, the coiled tubing 114 with the treatment device 122, fluid sensing system 126 and logging tool 128 thereon is deployed downhole. As these components are deployed, treatment, sensing and/or logging applications may be directed by way of a control unit 136 at the surface. For example, the treatment device 122 may be activated to release fluid from the injection port 124; the fluid sensing system 126 may be activated to collect fluid measurements; and/or the logging tool 128 may be activated to log downhole data, as desired. The treatment device 122, the fluid sensing system 126 and the logging tool 128 are in communication with the control unit 136 via a communication link (not shown) for conveying signals (e.g., power, communication, control, etc.) therebetween.

The control unit 136 is depicted as computerized equipment secured to the truck 108. However, the control unit 136 may be of a more mobile variety such as a laptop computer. Additionally, powered controlling of the application may be hydraulic, pneumatic and/or electrical. Regardless, the wireless nature of the communication allows the control unit 136 to control the operation, even in circumstances where subsequent different application assemblies may be deployed downhole. That is, subsequent mobilization of control equipment may not be included.

The control unit 136 may be configured to wirelessly communicate with a transceiver hub 138 of the coiled tubing reel 110. The receiver hub 138 is configured for communication onsite (surface and/or downhole) and/or offsite as desired. In some examples, the control unit 136 communicates with the sensing system 126 and/or logging tool 128 for conveying data therebetween. The control unit 136 may be provided with and/or coupled to databases, processors, and/or communicators for collecting, storing, analyzing, and/or processing data collected from the sensing system and/or logging tool.

Although the example methods and apparatus disclosed herein are discussed in conjunction with the example system 102 of FIG. 1, the example methods and apparatus disclosed herein are also applicable to other downhole tools such logging-while-drilling tools, wireline tools, and/or any other suitable downhole tool.

Figure 2A:
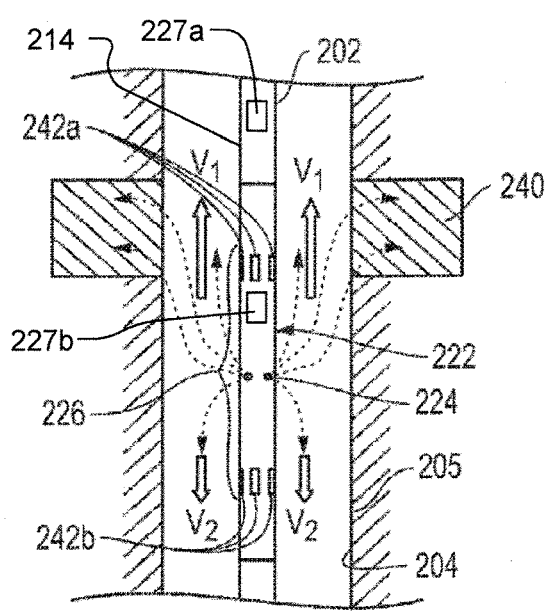
FIG. 2A illustrates various components of an example device that can implement embodiments of the methods and apparatus for determining downhole fluid parameters.
Figure 2B:
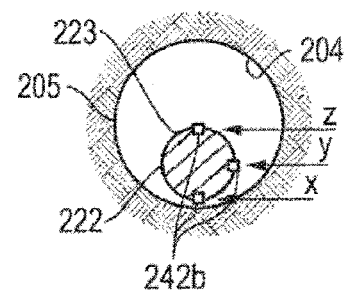
FIG. 2B illustrates various components of the example device of FIG. 2A that can implement embodiments of the methods and apparatus for determining downhole fluid parameters.
Figure 2C:
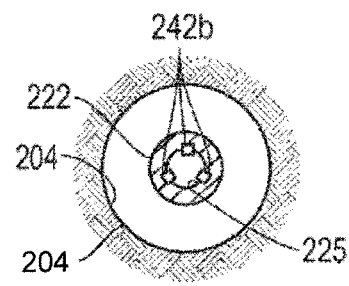
FIG. 2C illustrates various components of the example device of FIG. 2A that can implement embodiments of the methods and apparatus for determining downhole fluid parameters.

FIGS. 2A-2C are schematic views of a portion of a coiled tubing system 202 with a treatment device 222 and fluid sensing system 226 on a coiled tubing 214 thereof, usable as the coiled tubing system 102, the treatment device 122 and the fluid sensing system 126 of FIG. 1. FIG. 2A is a longitudinal view, partially in cross-section, depicting the fluid sensing system 226 positioned about the treatment device 222. As shown, the treatment device 222 has injection ports 224 for dispersing injection fluids into a well 204 as schematically depicted by the dashed arrows. In the illustrated example, the coiled tubing 214 and/or the fluid sensing system 226 includes one or more tool velocity sensors 227a, 227b (e.g., accelerometers) to determine a velocity of the coiled tubing system 202 and/or the fluid sensing system 226.

The injection fluid may be dispersed to treat a portion of the well 204, such as pay zone 240, to enhance production of fluid therefrom. As illustrated in FIG. 2A, stimulation fluid, such as acid, may be injected into the well 204 nearby the pay (or oil producing) zone 240 by means of the treatment tool 222. The acid is intended for the pay zone 240, but is shown positioned downhole therefrom. Precisely positioning the injection ports 224 against the zone of interest may be a challenging task due to uncertainties that may exist in target depth and/or tool position. The sensing system 226 around the injection port 224 may be tailored to measure the flow split upstream and downstream of the injection ports 224 in the well. The determined fluid movement may be used to indicate where the pay zone 240 is located relative to the injection port 224. Once known, the position of the treatment device 222 and the injection ports 224 may be positioned to effect treatment as desired.

As fluid is released from the treatment device 222, the flow of the fluid is split with an upstream portion of the injection fluid moving upstream and a downstream portion of the injection fluid moving downstream. The upstream portion of the injection fluid travels upstream at a given velocity as indicated by the arrows labeled V1. The downstream portion of the injection fluid travels downstream at a given velocity as indicated by the arrows labeled V2. While the fluid is depicted as flowing in a specific direction, it will be appreciated that the flow of the fluid may vary with the given operating conditions.

While the sensing system 226 is depicted in FIGS. 1 and 2A-2C as being positioned in a coiled tubing system 102 for determining fluid parameters about the injection port 224, it will be appreciated that the sensing system 226 may also be used in other fluid flow applications, such as detection of fluid cross-flow between zones, production logging (e.g., for single phase velocity, or in conjunction with Flow Scanner Imaging (FSI) complementary to a spinner in a low velocity range), downhole or surface testing in conjunction with use of a flowmeter (e.g., low speed Venturi based flowmeter applications), leakage detection (e.g., with dynamic seals), with other tools where flow velocity measurements is desired, among others. The sensing system 226 may be positioned on any surface, downhole and/or other movable equipment, such as a downhole tool, and/or in fixed equipment, such as a casing (not shown).

The sensing system 226 is depicted in FIG. 2A as having a plurality of sensor elements 242a,b positioned about the treatment device 222. In some examples, one or more sensor elements 242 a,b are positioned about the coiled tubing system 102 to perform fluid and/or other downhole measurements. In some such examples, the sensor elements 242a,b are positioned about the injection port(s) 224 to measure fluid parameters. The fluid measured is the injection fluid dispersed from the treatment device 222, but may also include other fluids in the well (e.g., water, hydrocarbons, gases, etc.) that mix with the injection fluid as it is dispersed.

An upstream portion of the sensor elements 242a are depicted as being positioned on the treatment device 222 a distance upstream therefrom. A downstream portion of the sensor elements 242b are depicted as being positioned on the treatment device 222 a distance downstream therefrom. The upstream sensor elements 242a and/or the downstream sensor elements 242b may be arranged radially about the treatment apparatus 222. In the illustrated example of FIG. 2B, the sensor elements 242a,b are positioned at various radial locations x,y,z about the treatment apparatus 222. While a specific configuration for the sensor elements 242a,b is depicted in FIGS. 2A and 2B, it will be appreciated that one or more sensor elements may be positioned at various locations (longitudinally and/or radially) about the coiled tubing system 202 and/or well 204.

At least some of the sensor elements 242a,b are capable of sensing fluid parameters, such as fluid direction and velocity. In some examples, more than one of the sensor elements 242a,b may be capable of measuring the fluid parameters. In some examples, at least one of the sensor elements 242a for measuring fluid parameters is positioned upstream from the injection port 224, and at least one of the sensor elements 242b for measuring fluid parameters is positioned downstream from the injection port 224. In this configuration, the measurements of the upstream and the downstream fluid sensors 242a,b may be compared to determine fluid parameters, such as fluid direction and/or fluid velocity. The ratio between upper and lower velocities and fluid direction obtained from measurements of the upstream and downstream sensing elements 242a,b may be used to generate real-time monitoring of where the fluid is flowing during the treatment, as will be described further herein. Other downhole parameters may also optionally be measured with the fluid sensing system 226 and/or other sensors positioned about the well.

Comparison of multiple sensing elements 242a,b may be used to account for differences in measurements taken by the various sensing elements 242a,b. In some examples, multiple sensing elements 242a,b are used to provide sufficient redundancy and confidence in the measurement results. This redundancy may also reduce the severity of impact where one or more sensor elements 242a,b fails, such as in harsh downhole environments involving the use of acids. The multiple sensing elements 242a,b may also be used to generate fluid direction and/or velocity information. In such cases, at least one upstream sensor element 242a and at least one downstream sensor element 242b may be used. In some examples, additional sensor elements 242a,b are provided to enhance reliability of the values generated.

In some cases, it may be useful to consider the position of the sensing element 242a,b about the treatment tool 222. The number of arrays (or sets of sensing elements 242a,b), as well as the number of sensing elements 242a,b per array, may vary. As shown in FIG. 2A, the sensing elements 242a,b are positioned upstream and downstream to measure fluid as it passes upstream and downstream from the injection ports 224. In some examples, when using corresponding upstream and downstream sensing elements 242a,b, the corresponding sensing elements 242a,b, are positioned at equal distances from the injection port 224. In some examples, corresponding sensing elements 242a,b are identically matched. Matched sensing elements may be spaced at equal distances.

In the illustrated example, multiple sensing elements 242a,b are also positioned about the circumference of the tool at 90-degree intervals x, y, z as shown in FIG. 2B. As shown in FIG. 2B, the sensing elements 242b are positioned at radial locations x, y and z about the treatment device 222. The sensing element 242b at position x is against a wall 205 of the well 204. The azimuthal arrangement of sensing elements 242a,b at positions x, y, z provides redundancy in case one side of measurements is impeded.

An issue may appear when the tool body (e.g., the treatment tool 222) is eccentric (or not concentric) with the well 204 as shown in FIG. 2B. In this case, some sensing elements $242b_x$ located closer to the wall 205 of the well 204 may read a lower flow value than sensing elements $242b_y$, $242b_z$ positioned farther from the wall. In such cases, it may be desirable to ignore or remove measurements from potential obstructed sensing elements, such as the sensing element $242b_x$.

As shown in FIG. 2B, the sensing elements 242b are positioned on an outer surface 223 of the treatment tool 222. The sensing elements 242b may be flush with the outer surface 223, recessed below the outer surface 223 or extended a distance therefrom. In some examples, the sensing elements 242b are positioned such that each sensing element 242b contacts fluid for measurement thereof, but remains protected. To prevent damage in harsh downhole conditions, protrusion of the sensing elements 242b from the treatment tool may be reduced. As shown in FIG. 2C, the sensing elements 242b may also be positioned inside the treatment tool 222, for example, on an inner surface 225 thereof.

Figure 3:
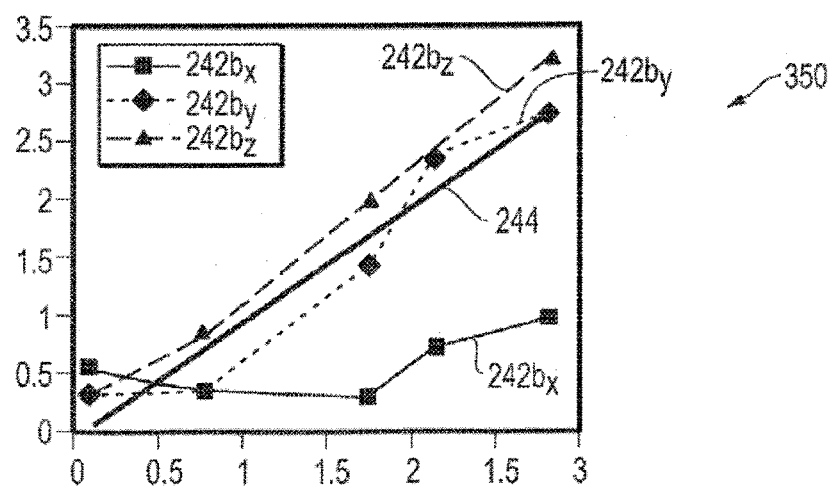
FIG. 3 is a graph depicting sensor measurements taken using the example device of FIG. 2B.

FIG. 3 is a graph 350 depicting sensor data taken from the sensing elements 242b as depicted in FIG. 2B. The graph 350 plots flow velocity (x-axis) as a function of sensor output (y-axis) for sensing elements $242b_x$, $242b_y$, and $242b_z$ at positions x, y and z, respectively. As depicted by the graph 350, the flow velocity of the sensing elements $242b_y$ and $242b_z$ at positions y and z are different from the flow velocity of the sensing element $242b_x$ at position x. In other words, the readings of both the top sensing element $242b_z$ and the 90-degree sensing element $242b_y$ are substantially consistent in determining the flow velocity. However the bottom sensing element $242b_x$ has a flow velocity that is lower.

The graph 350 indicates that the sensing element $242b_x$ at position x is pressed against the wall 205 of the well 204 and is unable to obtain proper readings. Thus, the measurements depicted by line $242b_x$ taken by sensing element 242b at position x may be disregarded. The measurements depicted as lines $242b_y$ and $242b_z$ taken by sensing elements 242b at positions y and z, respectively, may be combined using conventional analytical techniques (e.g., curve fitting, averaging, etc.) to generate an imposed flow 244. Thus, by placing several sensing elements 242a,b azimuthally around the circumference of a tool and detecting the lowest reading sensing element (e.g., $242b_x$), the azimuth of a flow obstruction may be determined. The sensing element located opposite to the lowest-reading sensing element (e.g., $242b_y$), or combinations of other sensing elements, may then be used to perform the flow measurement.

Figure 4A:
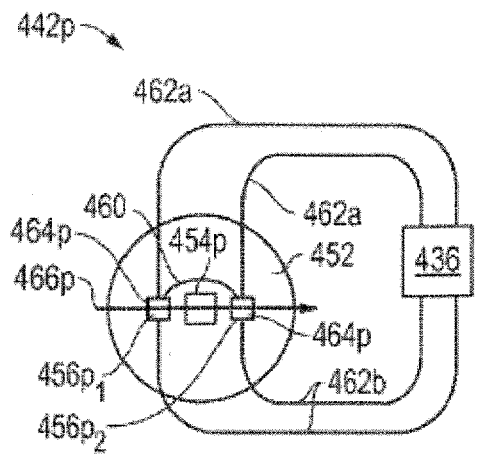
FIG. 4A illustrates various components of an example device that can implement embodiments of the methods and apparatus for determining downhole fluid parameters.
Figure 4B:
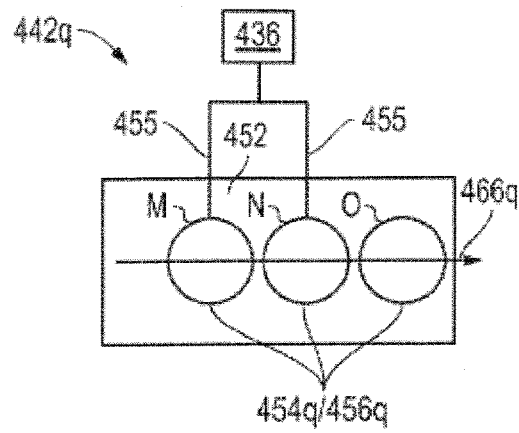
FIG. 4B illustrates various components of an example device that can implement embodiments of the methods and apparatus for determining downhole fluid parameters.

FIGS. 4A and 4B are schematic views of sensing elements 442p and 442q usable as the sensing elements 242a,b of FIGS. 2A and 2B. Each of the sensing elements 442p,q has a heater 454p,q and a sensor 456p,q, respectively, positioned in a sensor base 452. In the illustrated example, the sensor 456p,q is a temperature sensor (or temperature sensor) capable of measuring fluid temperature.

In some examples, the sensor elements 442p,q are calorimetric type flow sensors (or flow meters) that have two sensing elements, namely a sensor for velocity measurement (scalar sensor) and a sensor for directional measurement (vector sensor). The heater 454p,q and the temperature sensor 456p,q interact to operate as velocity (or scalar) and directional (or vector) sensors.

To determine fluid velocity, the sensing elements 442p,q act as calorimetric sensors. The heater 454p,q (or hot body) of each sensor elements 442p,q is placed in thermal contact with the fluid in the well 104. The rate of heat loss of the heater 454p,q to the fluid is a function of the fluid velocity as well as thermal properties. A heat dissipation rate of the heater 454p,q may be measured, and a flow velocity can be determined for a known fluid. The heater 454p,q generates heat (e.g., from electricity), and dissipates the heat to the fluid in contact. The rate of heat generation and the temperature may be readily measurable during operation. The temperature sensor 456p,q may be used to monitor ambient temperature of the fluid, while the heater 454p,q is capable of measuring its own temperature during heating. The difference between the temperature of the heater 454p,q and the ambient temperature of the fluid is defined as temperature excursion. The temperature excursion, ΔT, may be written as follows:

$$\Delta T = T_h - T_a. \qquad \text{Equation (1):}$$

In Equation 1, $T_a$ represents the ambient temperature of the fluid as measured by the temperature sensor; $T_h$ represents the temperature of the heater; and the temperature excursion is proportional to the heater power at a given flow condition. Thermal conductance, $G_{th}$, may be calculated according to following expression:

$$G_{th} = \frac{P}{T_h - T_a} = \frac{P}{\Delta T}. \qquad \text{Equation (2)}$$

In Equation 2, P represents the heater power in steady state.

The inverse of this proportionality (or the thermal conductance) correlates the flow velocity $V_{flow}$ because $V_{flow}$ is a function of $G_{th}$. The measurements taken by the calorimetric sensing elements 454p,q obtain the heater-fluid thermal conductance. As provided by Equation 1, the thermal conductance is determined from three quantities: P (the heater power), $T_h$ (the temperature of the heater) and $T_a$ (the temperature of the fluid ambient). The quantities may be measured in steady state. Theoretically, the amount of power or temperature excursion used during measurement is immaterial to resultant thermal conductance. However, power and temperature excursion may affect accuracy because physical measurements have limits. In some cases, such as the configuration of FIG. 4B, a ΔT of a few degrees in Kelvin (K) may be considered appropriate.

A measurement technique may involve either constant excursion or constant power. For the constant excursion technique, power sent to the heater may be regulated by electronics (e.g., the control unit 136) such that the heater temperature may be maintained at a constant excursion above the fluid ambient. In steady state, the power measured is directly proportional to the thermal conductance. For the constant power technique, the heater may be supplied with a constant and predetermined power, while the heater temperature $T_h$ varies and may be determined by flow velocity. In steady state, the temperature excursion is inversely proportional to the thermal conductance.

Figure 5A:
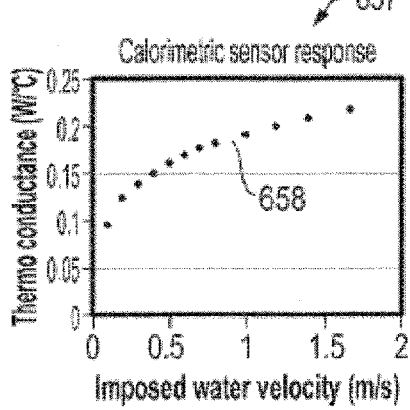
FIG. 5A is a graph illustrating sensor measurements.

FIG. 5A is a graph 657 depicting a flow response of a calorimetric sensor, such as the sensing elements 442a,b depicted in FIGS. 4A and 4B. The resulting thermal conductance verses flow curve 658 demonstrates that thermal conductance is non-linear relative to the flow velocity. However, the thermal conductance verses flow curve 658 is monotonic. Therefore, a correlation can be established to invert the measurement, and the flow velocity can be obtained as described in conjunction with Equations 1-2.

The measurement of flow velocity is a measurement of the thermal conductance between the heater 454p,q and the fluid. The measurement of thermal conductance may be determined with constant temperature excursion (ΔT) or constant heater power. The constant temperature excursion may regulate temperature. The constant heater power may regulate power. Either measurement technique may involve two sensing elements, such as a heater 454p,q and a temperature sensor 456p,q.

Referring back to FIGS. 4A and 4B, the sensing elements 442p,q may also act as scalar sensors to determine fluid direction. In the illustrated example, the sensing elements 442p,q are capable of acting as both calorimetric sensors for determining fluid velocity and vector sensors for measuring fluid direction. Calorimetric sensors may be unable to determine fluid direction. In such examples, calorimetric sensors may respond to fluid velocity regardless of direction. Fluid direction may be acquired by a second measurement, such as by using vector sensors capable of fluid direction detection. Fluid direction may also be acquired by, for example, the sensing elements $442p,q$ of FIGS. 4A and 4B configured for measurement of both fluid velocity and direction. The physics that enables directional detection may also involve detection of asymmetry in temperature between upstream and downstream sensing elements (e.g., caused by heat from the heater $454p$ of the upstream sensing element), such as the upstream sensing elements $242a$ and the downstream sensing elements $242b$ of FIG. 2A. FIGS. 4A and 4B depict configurations of the sensing element $442p,q$ capable of detecting both fluid flow rate and direction. FIG. 4A depicts a thermocouple (TC) sensing element $442p$. FIG. 4B depicts a dual sensing element $442q$. The base $452$ for each sensing element $442p,q$ is sized for hosting the heater $454p,q$, the sensor $456p,q$ and/or other devices therein.

In some examples, the base $452$ has a minimum thickness, or is recessed in the downhole tool, to prevent damage in the well $104$. The sensor base $452$ is positionable downhole, for example, on the treatment device $122$, $222$ and/or the coiled tubing $114$, $214$ (FIGS. 1, 2A, 2B). The base $452$ may be round as shown in FIG. 4A or rectangular as shown in FIG. 4B. The base $452$ may be made of epoxy, PEEK molding and/or any other material.

The heater $454p,q$ and the temperature sensor $456p,q$ may be positioned in close proximity in base $452$, but are thermally isolated from each other. In the illustrated example, because the heater $454p,q$ creates a temperature gradient in the fluid, the temperature sensor $456p,q$ is provided with sufficient thermal isolation from the heater $454p,q$ to prevent the temperature sensor $456p,q$ from being disturbed by the heat flux of the heater $454p,q$ or thermally coupling with the heater $454p,q$, which may result in an erroneous measurement value. The temperature sensor $456p,q$ may optionally be positioned in a separate package spaced from the heater $454p,q$.

The TC sensing element $442p$ of FIG. 4A is depicted as having a pair of TC junctions (or sensors) $456p_{1,2}$ on either side of a heating pad (or heater) $454p$. The TC junctions $456p_{1,2}$ are linked by a metal wire $460$. Each TC junction $456p_{1,2}$ has a TC pad with leads $462a,b$ extending therefrom. In some examples, the leads $462$ are also wires operatively coupled to a controller $436$ for operation therewith.

The TC junctions $456p$ positioned on either side of the heater $454p$ may be used to detect a temperature imbalance therebetween, and convert it into a TC voltage. A small voltage is present if the two TC junctions $456p_{1,2}$ are at a different temperatures. The TC junctions $456p_{1,2}$ are positioned very close to the heater $454p$ (one on each side) for maximum contrast of temperature. At zero flow, the heater $454p$ may heat up both TC junctions $456p_{1,2}$. However, the heating does not produce voltage.

Two metal pads $464p$ are depicted as supporting the TC junctions $456p_{1,2}$. The metal pads $464p$ may be provided to improve the thermal contact between the TC junctions $456p_{1,2}$ and the fluid. The metal pads $464p$ may be useful in cases where the TC junctions $456p_{1,2}$ are of a small size. The metal pads $464p$ and the TC junctions $456p_{1,2}$ may be held together by thermal adhesives such as silver epoxies or any other thermally conductive adhesives. The metal pads $464p$ are positioned in alignment with the heater $454p$, thereby defining a flowline $466p$ along the sensing element $442p$ as indicated by the arrow.

Figure 5B:
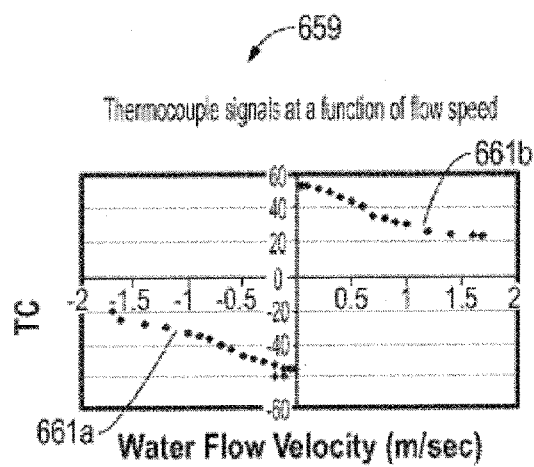
FIG. 5B is another graph illustrating sensor measurements.

TC voltage (y-axis) as a function of flow velocity (x-axis) is show in a graph $659$ of FIG. 5B. The graph $659$ exhibits an odd function of the flow velocity measured by the TC junctions $456p_{1,2}$. The magnitude of the maxima near zero flow tapers off gradually with increasing velocity. At zero crossing, the TC signal output undergoes an abrupt change in polarity from negative to positive as indicated by curves $661a,b$, respectively. This change in signal polarity may be used to detect the fluid direction as described in greater detail below.

Figure 6:
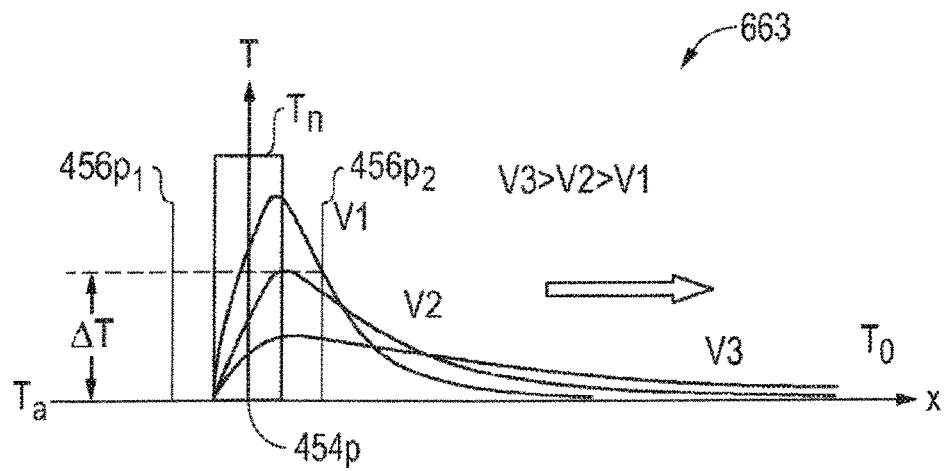
FIG. 6 is a graph of sensor measurements and fluid flow based on the sensor measurements.

The temperature profile along a flow stream of, for example, the sensing element $442p$ is shown schematically in FIG. 6. FIG. 6 is a graph $663$ depicting temperature (y-axis) versus velocity (x-axis). As depicted by this graph, the heater $454p$ generates a constant heat $T_h$ measurable by the TC junction $456p_{1,2}$ on either side thereof. Heat from the heater $454p$ is carried downstream by the fluid forming a hot stream. The velocity V1, V2 and V3 are measured at, for example, different time intervals. The visibility of the thermal gradient may depend on the velocity. Thermal gradient between upstream and downstream is detectable with the sensor element $442p$. This creates a temperature contrast between the upstream and downstream TC junctions $456p_{1,2}$. This indicates that the flow is moving towards the TC junctions $456p_2$, thereby indicating fluid flow direction. By detecting the asymmetry between the TC junctions $456p_{1,2}$, the fluid direction can be determined as indicated by the arrow.

The dual-element sensing element $442q$ of FIG. 4B is depicted as having two identical elements (sensors/heaters) $456q/454q$. The sensors/heaters $456q/454q$ are depicted as Element M and Element N in the sensing element $442q$. In some examples, the heater $454q$ and the sensor $456q$ (and, therefore, Elements M and N) are interchangeable in function and operation. In such cases, the sensor $456q$ is capable of performing the functions of the heater and the heater $454q$ is capable of performing the functions of the sensor. The Elements M and N are operatively linked via links $455$ to the controller $436$ for operation therewith.

In some configurations, the desired measurement may be operated in self-referenced mode in which a single Element M or N plays a dual role, both as heater and as temperature sensor. In such cases, the heater and the temperature sensor may utilize a time multiplexing technique. In some examples, the role of the heater $454q$ and temperature sensor $456q$ may be reassigned at anytime. This measurement scheme may be used to provide flexibility in designing and/or operating the sensor element $442q$, which may be tailored to a particular application.

An asymmetry of temperature between the identical Elements M and N is detectable by the dual-element sensor $442q$. The two identical Elements M and N are positioned along a line of flow of the fluid as indicated by the arrow. The Elements M and N may be positioned in close proximity, for example, within the same base (or package) $452$.

Measurement by the sensor element of FIG. 4B may be achieved using various methods. A first method involves measuring the heater power in flow using Element M as the heater and Element N as the temperature sensor. After a stable reading is attained, the roles of Elements M and N interchange and the measurement is repeated. Comparing the power of the two measurements, fluid direction can be ascertained. The heater that consumes more power is located upstream, provided that the flow does not vary in the meantime. This strategy may be less reliable at low velocity as power diminishes in both cases. A second method that may be used involves measuring by heating both elements M and N simultaneously with same amount of power. The measurements of each element may be compared. Whichever element reveals a higher temperature is downstream in the direction of the fluid flow. A third method that may be used involves watching the temperature of Element M while switching on and off Element N at a certain power level. If an alteration of temperature is noticed, Element N may be assumed to be upstream of Element M. No change may suggest otherwise.

With the first two methods, where quantities are compared across Elements M and N, a good match of characteristics of the two elements M,N reduces potential errors. The match of elements may be achieved by calibration and normalization. The third method, on the other hand, may be used without as good of a match. Dual-element sensors are usable, for example, for bi-directional flow.

When the temperature sensor 456$p,q$ and the heater 454$p,q$ of FIGS. 4A and 4B reside in the same package (for instance, due to space constraint), the temperature sensor 456$p,q$ is positioned upstream of the heater 454$p,q$ (or element M is upstream of Element N). If flow goes in both directions, the temperature sensor 456$p,q$ and heater 454$p,q$ (or Elements M and N) may be positioned in a side-by-side (or flowline) configuration in line with the flow of the fluid as shown in the sensing elements 442$p,q$ of FIGS. 4A and 4B.

While FIG. 4A depicts a single heater 454$p$ with a pair of TC junctions 456$p$ and FIG. 4B depicts a single heater 454$p$ with a single temperature sensor 456$q$, it will be appreciated that multiple heaters 454$p,q$ and/or sensors 456$p,q$ may be provided. Additional sensors and/or other devices may be incorporated into the sensing elements and/or used in combination therewith. In sensor systems involving multiple heaters, one temperature sensor 456$p,q$ can serve multiple heaters 454$p,q$. Some multi-elements sensors have more than two elements (e.g., M, N, P, D . . . ). As shown in FIG. 4B, a third element O may be provided. In another method of measurement, the three or more elements (e.g., M, N, O) may be used to detect fluid direction by heating a middle element and comparing the temperature between upstream and downstream elements thereabout.

As shown, the sensing elements 442$p,q$ of FIGS. 4A and 4B (and/or the sensors, heaters, elements and/or other components used therein and/or therewith) are operatively coupled to the controller 436 for providing power, collecting data, controlling and/or otherwise operating the sensing element 442$p,q$. The controller 436 may be, for example, the logging tool 128, the control unit 136 and/or other electronics capable of providing power, collecting data, controlling and/or otherwise operating the temperature sensors 456$p,q$, heater 456$p,q$ and/or other elements of the sensing elements 442$p,q$. The power sources may be batteries, power supplies and/or other devices internal to and/or external to the sensing elements. In some cases, other devices such as the logging tool 128 of FIG. 1 may provide power thereto. Such electronic devices may be internal and/or external to the sensing elements. Communication devices may be provided to wire and/or wirelessly coupled the sensing elements to downhole and/or surface communication devices for communication therewith. In some cases, communication devices, such as transceivers (not shown) may be provided in the sensing elements. In other cases, the sensing elements may be linked to the logging tool 128 (FIG. 1) or other devices for communication as desired.

The sensing elements are also operatively coupled to and/or in communication with databases, processors, analyzers, and/or other electronic devices for manipulating the data collected thereby. The power, electronic and/or communication devices may be used to manipulate data from the sensing elements, as well as other sources. The analyzed data may be used to make decisions concerning the wellsite and operation thereof. In some cases, the data may be used to control the well operation. Some such control may be done automatically and/or manually as desired.

Figure 7:
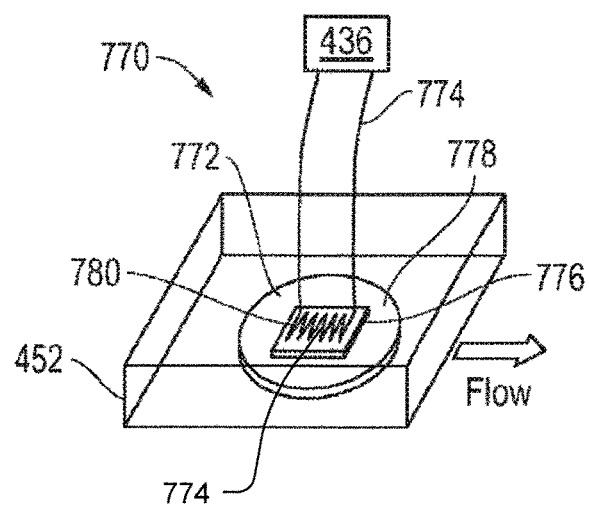
FIG. 7 illustrates various components of an example device that can implement embodiments of the methods and apparatus for determining downhole fluid parameters.

While elements of the heater and the temperature sensor may be physically identical, the sensor can have a variety of types, forms and/or shapes. FIG. 7 depicts the sensor 770 usable as an element of the sensor elements 454$p,q$ of FIGS. 4A and/or 4B. FIG. 7 depicts the sensor 770 usable as the heater 454$q$ and/or the temperature sensor 456$q$, as elements M, N and/or O, or in combination therewith. A shown, the sensor 770 is positionable in the base 452. The sensor 770 may be operatively coupled to the controller 436 via wires 774 for operation therewith in the same manner as previously described for the sensor elements 442$p,q$.

The example sensor 770 is an RTD type sensor with a resistance that varies with temperature. In some examples, RTDs are used for temperature sensing purposes. However, the sensor 770 may generate heat when current passes through the sensor 770. Thus an RTD can be used both as a heater and a temperature sensor (e.g., 454$p,q$ and 456$p,q$ of FIG. 4B). A thin-film type RTD capable of use as both a heater and temperature sensor may be used so that it can interchangeably operate as the Element M, N and/or O of FIG. 4B.

As shown in FIG. 7, the surface sensor 770 positioned in the base 452 has a front (or contact surface) 772 positionable adjacent the fluid for taking measurements therefrom. A common type of RTD employs platinum in the form of either wire or thin film (or resistor) 774 deposited on a heat-conductive substrate 776, such as sapphire or ceramic. The wire 774 is positioned in the film 776 and extends therefrom for operative linkage with the controller 436. The heat-conductive substrate 776 may be adhered or bonded to a thin pad 778 (made of, for example, Inconel or ceramic substrate) by a thermally conductive adhesive 780, such as silver epoxy, or by brazing. In some examples, such bonding provides low thermal resistance.

As depicted, the RTDs are wrapped in protective packaging, but they may differ by thermal mass and, hence, response time. The shape of the pad 778 may be square, circular or any other shape capable of supporting the RTD in the base 452. In some examples, the pad 778 has a dimension of about 10 mm (or more or less), and a thickness sufficient for mechanical viability. The thickness and material selected may determine the performance of heater-fluid thermal contact.

The surface sensor 770 may be configured with a large surface area for contact with the fluid and/or large thermal mass for passage of heat therethrough. A larger thermal mass may result in a relatively slower measurement response. However, the thermal mass may also assist in reducing (e.g., averaging out) spurious variations in readings caused by turbulence. Sensor electronics may also be provided to reduce spurious variations.

The sensor 770 and/or the sensing element 442$q$ may be configured in a surface (or non-intrusive) form with a low profile (or thickness) as shown in FIGS. 7 and 4B. The sensor 770 and/or the sensing element 442$q$ may be positionable downhole via a downhole tool (e.g., coiled tubing system 102 of FIG. 1) extending a small distance (if any)

therefrom. This low profile or non-intrusive surface form may be provided to reduce the disturbance to the fluid flowing across the sensor, while still allowing for measurement of the fluid. Moreover, the low profile surface form may also be configured to limit the amount of protrusion from the downhole the tool and, therefore, potential damage thereto.

The examples disclosed above may be used to determine downhole fluid parameters using one or more methods described in U.S. Publication No. 2011/0315375, which is hereby incorporated herein by reference in its entirety.

In some examples, the sensing system 226 determines a velocity of a fluid in the well 204 when a portion of the coiled tubing system 202 such as, for example, the treatment device 222 is moving toward or away from the surface. In some examples the fluid is a mixture including, for example, injection fluid dispersed from the treatment device 222, water, hydrocarbons (e.g., asphaltenes), gas, liquid, an emulsion, fluids of different phases (e.g., a multi-phase fluid), particulates and/or debris (e.g., sediment, rock, cuttings, etc.), surfactants (e.g., polymer, viscoelastic surfactant, etc.), and/or any other fluid, particulate and/or debris. The fluid flows in a fluid flow passageway defined by the well 204.

In some examples, the sensing system 226 determines the velocity of the fluid based on a velocity of the treatment device 222. The velocity of the treatment device 222 may be determined when the treatment device 222 is substantially stationary, moving along a vertical portion of the well 204, moving along a horizontal portion of the well 204, and/or moving along any other portion of the well 204. In some examples, the velocity of the treatment device 222 is determined based on a velocity of the coiling tubing 214. In some such examples, the measuring wheel 115 of the surface delivery equipment 106 determines the velocity of the coiled tubing 214 being advanced into the well 204 or pulled out of the well 204 via the reel 110. Based on the velocity of the coiled tubing 214, the velocity of the treatment device 222 may be determined. In some examples, one or more of the tool velocity sensors 227a, 227b determines the velocity of the treatment device 222 and/or the coiled tubing 214. In other examples, a velocity of another portion(s) of the coiled tubing system 202 moving relative to a surface of Earth is used to determine the velocity of the treatment device 222.

In some examples, the velocity of the treatment device 222 is associated with a direction of movement of the treatment device 222. In some examples, if the treatment device 222 is moving toward the surface, the velocity of the treatment device 222 is a negative value such as, for example, −1 m/s. In such examples, if the treatment device 222 is advancing in the well 204, the velocity is associated with a positive value such as, for example, +1 m/s.

In some examples, the treatment device 222 is moved (e.g., advanced into the well, moved toward the surface, etc.) based on a direction of fluid flow. In the illustrated example, the sensor elements 242a,b of the sensing system 226 determine the direction of the fluid flow. In some examples, the sensor elements 242a,b include one or more RTD type sensors such as, for example, the example sensor 770. In some examples, the treatment device 222 is moved in the same direction as the fluid flow. For example, if the sensor elements 242a,b determine that the fluid is moving toward the surface (i.e., along the passageway defined by the well 204), the treatment device 222 is moved toward the surface. In other examples, if the sensor elements 242a,b determine that the fluid is moving away from the surface, the treatment device 222 is advanced in the well 204.

In some examples, while the treatment device 222 is moving, a fluid sensor such as, for example, the sensor elements 242a,b determine a velocity of the fluid relative to the treatment device 222 (i.e., a relative fluid velocity) and/or a direction of the fluid flow relative to the treatment device 222 (i.e., a relative fluid flow direction). The relative fluid velocity is a difference of the velocity of the fluid and the velocity of the treatment device 222. For example, if the treatment device 222 is moving in the same direction as the fluid at the same velocity, the relative fluid velocity is zero m/s.

In some examples, the relative fluid velocity is associated with a direction of the fluid flow relative to the treatment device 222. For example, if the fluid is flowing toward the surface relative to the treatment device 222 (e.g., the fluid is flowing toward the surface faster than the treatment device 222 is moving toward the surface), the relative fluid velocity is a negative value such as, for example, −0.5 m/s. In such examples, if the fluid is flowing away from the surface relative to the treatment device 222, the relative fluid velocity is a positive value. In some examples, when the direction of the relative fluid velocity changes (i.e., a sign of the value changes from positive to negative or from negative to positive), the relative fluid velocity is substantially zero. As described in greater detail below, based on the velocity of the treatment device 222 and the relative fluid velocity and/or the relative fluid flow direction, the velocity of the fluid may be determined.

Figure 8:
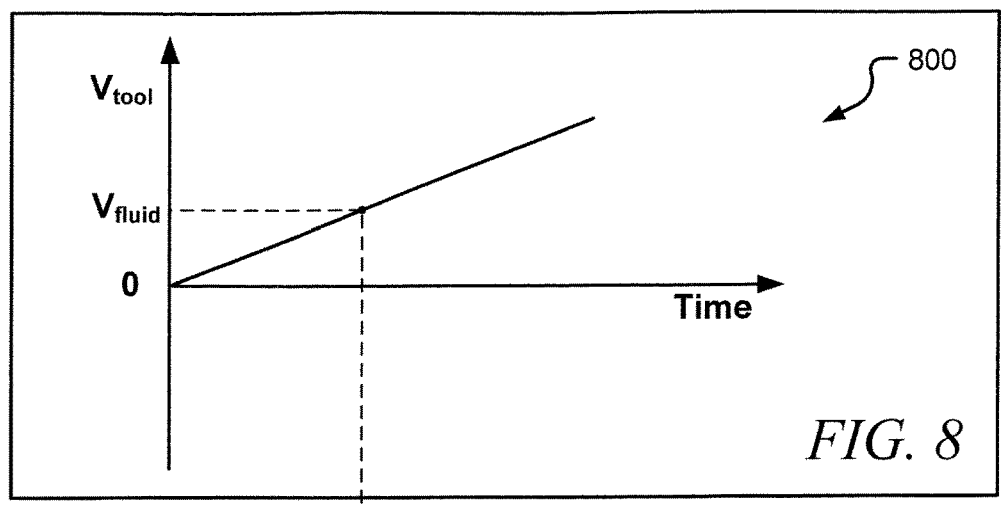
FIG. 8 is a chart that plots velocity of a portion of a downhole tool as a function of time.

FIG. 8 is a graph 800 illustrating a velocity of the treatment device 222, $V_{tool}$, when the treatment device 222 is moving in a first direction in the well 204. In the illustrated example, when the treatment device 222 is moving in the first direction in the well 204, the treatment device 222 is advancing (e.g., lowering) in the well 204. In the illustrated example, the velocity of the treatment device 222 is increasing and, thus, movement of the treatment device 222 is accelerating.

Figure 9:
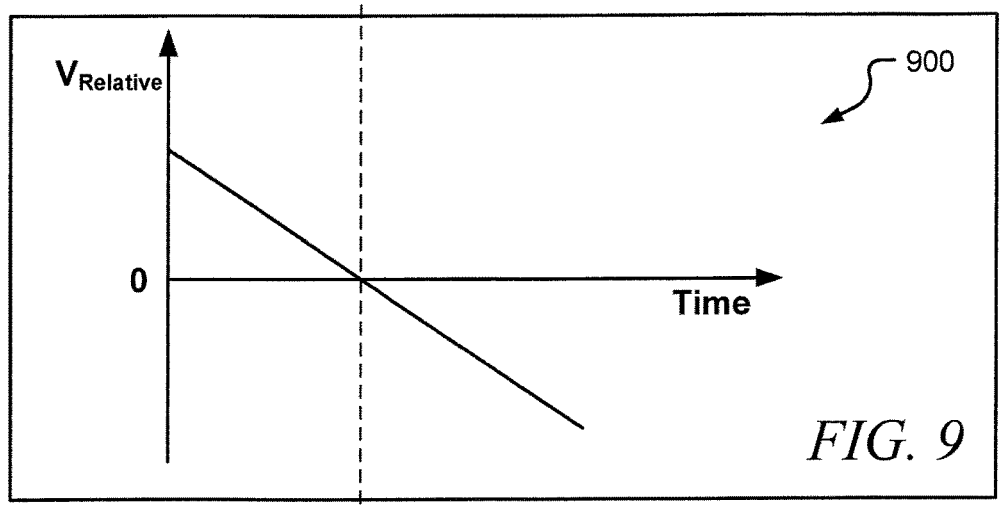
FIG. 9 is a chart that plots a velocity of a fluid relative to the portion of the downhole tool.

FIG. 9 is a graph 900 illustrating a response of one of the sensor elements 242a,b implemented as a fluid velocity sensor when the treatment device 222 is moving in the first direction. In the illustrated example, the response of the sensor elements 242a,b is the relative fluid velocity, $V_{Relative}$. In the illustrated example of FIG. 9, the fluid is moving in the same direction as the treatment device 222 (i.e., the first direction). Thus, as the velocity of the treatment device 222 increases from a velocity of about zero m/s (i.e., as the treatment device 222 accelerates from a substantially stationary state), the relative fluid velocity decreases. In the illustrated example, the relative fluid velocity changes from a positive value to a negative value, thereby indicating that the treatment device 222 accelerated from a velocity less than the velocity of the fluid to a velocity greater than the velocity of the fluid.

When the relative fluid velocity equals zero, the velocity of the fluid and the velocity of the treatment device 222 are substantially the same. Thus, the velocity of the fluid may be determined using the example graph 800 of FIG. 8 and the example graph 900 of FIG. 9 by determining the velocity of the treatment device 222 when the relative fluid velocity equals zero.

Figure 10:
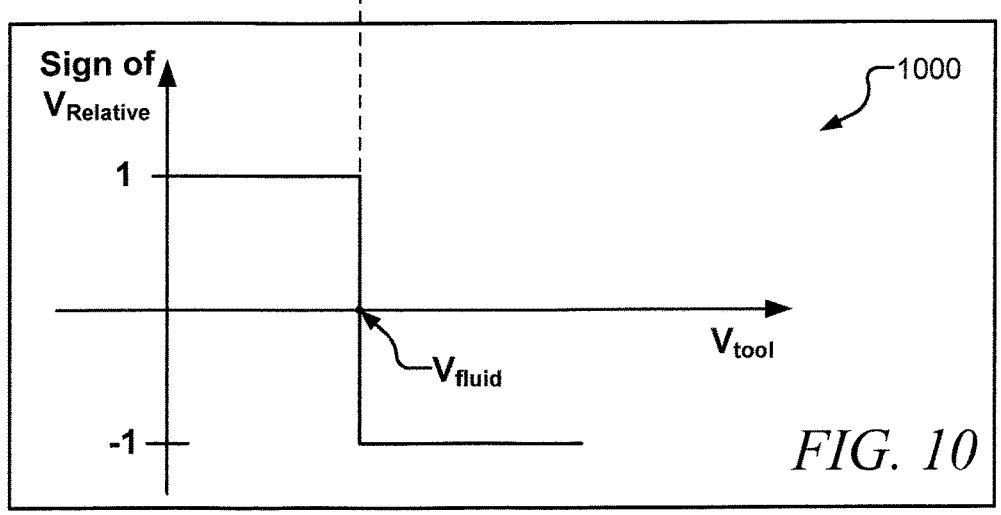
FIG. 10 is a chart that plots a sign of a value of the velocity of the fluid relative to the portion of the downhole tool as a function of the velocity of the portion of the downhole tool.

FIG. 10 is a graph 1000 plotting the response of one of the sensor elements 242a,b implemented as a scalar sensor (i.e., a fluid direction sensor). In the illustrated example, the response of the sensor elements 242a,b is sign (e.g., positive or negative) of the value of the relative fluid velocity as a function of the velocity of the treatment device 222, $V_{tool}$. In the illustrated example, the sign of the relative fluid velocity corresponds to the direction of the relative fluid velocity (e.g., if the fluid is flowing toward the surface relative to the treatment device 222, the relative fluid velocity is a negative value). Based on the example graph 800 of FIG. 8 and the example graph 900 of FIG. 9, the example graph 1000 of FIG. 10 may be plotted.

In some examples, the velocity of the fluid is determined based on the direction of the fluid flow relative to the treatment device 222 (i.e., the relative fluid flow direction). For example, when the relative fluid flow direction changes (e.g., from flowing toward the surface relative to the treatment device 222 to flowing away from the surface relative to the treatment device 222), the relative fluid velocity is substantially zero. Thus, in the illustrated example of FIG. 10, the velocity of the treatment device 222 substantially equals the velocity of the fluid when the sensor elements 242a,b detect a change in the relative fluid flow direction (e.g., when the sensor elements 242a,b are implemented as a scalar sensor and/or when the sensor elements 242a,b are implemented as a fluid sensor and the value of the relative fluid velocity changes from positive to negative or from negative to positive). Thus, the example sensor elements 242a,b may be used to determine the velocity of the fluid when the treatment device 222 is moving in the well 204 based on the velocity of the treatment device 222 and the relative fluid flow direction. In the illustrated example, the sensor elements 242a,b can sense fluid flow of a velocity of about 5 millimeters per second or greater.

Figure 11:
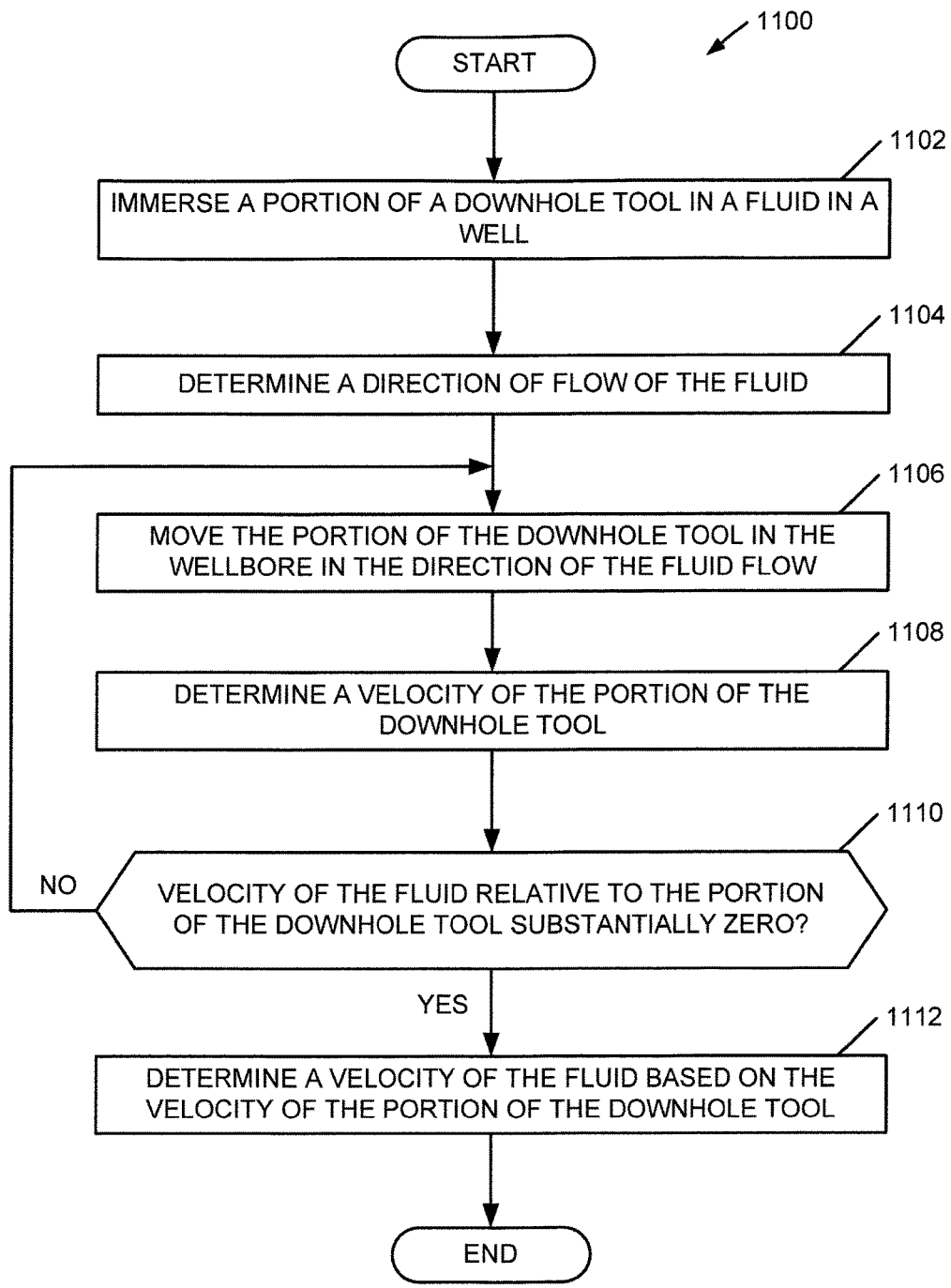
FIG. 11 illustrates example method(s) for determining downhole fluid parameters in accordance with one or more embodiments.

FIG. 11 is a flowchart representative of an example method disclosed herein. At least some of the example method of FIG. 11 may be carried out by a processor, the logging tool 128, the controller 436 and/or any other suitable processing device. In some examples, at least some of the example method of FIG. 11 is embodied in coded instructions stored on a tangible machine accessible or readable medium such as a flash memory, a ROM and/or random-access memory RAM associated with a processor. Some of the example method of FIG. 11 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, one or more of the operations depicted in FIG. 11 may be implemented manually or as any combination of any of the foregoing techniques, for example, any combination of firmware, software, discrete logic and/or hardware. Further, although the example method is described in reference to the flowchart illustrated in FIG. 11, many other methods of implementing the example method may be employed. For example, the order of execution of the blocks may be changed, and/or some of the blocks described may be changed, removed, sub-divided, or combined. Additionally, any of the example method of FIG. 11 may be carried out sequentially and/or carried out in parallel by, for example, separate processing threads, processors, devices, discrete logic, circuits, etc.

Further, although the example process of FIG. 11 is described with reference to the flow diagram of FIG. 11, other methods of implementing the process of FIG. 1 may be employed. For example, the order of execution of the blocks may be changed, and/or some of the blocks described may be changed, removed, sub-divided, or combined. Additionally, one or more of the operations depicted in FIG. 11 may be performed sequentially and/or in parallel by, for example, separate processing threads, processors, devices, discrete logic, circuits, etc.

FIG. 11 illustrates an example method 1100 disclosed herein that may be used to determine a velocity of a fluid in a well such as, for example, the well 204 of FIG. 2. The example method begins by immersing a portion of a downhole tool such as, for example, the example treatment device 222 of FIG. 2A in a fluid in a well (block 1102). In some examples, the fluid is a mixture including the injection fluid dispersed from the treatment device 222, water, hydrocarbons (e.g., asphaltenes), gases, an emulsion, a multi-phase fluid, particulates, debris (e.g., sediment, rock, cuttings, etc.), surfactant (e.g., polymer, viscoelastic surfactant, etc), etc. At block 1104, a direction of flow of the fluid is determined. In some examples, the fluid sensing system 226 of the fluid treatment device 222 includes one or more RTD type sensors such as, for example, the example sensor 770 of FIG. 7 to determine the direction of the flow of the fluid.

At block 1106, the portion of the downhole tool is moved in the direction of the fluid flow. In some examples, if the fluid is flowing toward the surface along the passageway defined by the well, the portion of the downhole tool is moved toward the surface. In other examples, if the fluid is flowing away from the surface, the portion of the downhole tool is advanced in the well (e.g., lowered). At block 1108, a velocity of the portion of the downhole tool is determined (block 1108). In some such examples, a velocity of coiled tubing being advanced into the well or pulled out of the well is determined via a measuring wheel such as, for example, the example measuring wheel 115 of FIG. 1 to determine the velocity of the portion of the downhole tool. In some examples, tool velocity sensors such as, for example, the tool velocity sensors 227a, 227b of FIG. 2 determine the velocity of the portion of the downhole tool.

At block 1110, whether the velocity of the fluid relative to the portion of the downhole tool is substantially zero is determined. In some examples, whether the velocity of the fluid relative to the portion of the downhole tool is substantially zero is determined based on a response of a sensor including a resistance temperature detector (e.g., the sensing element 442p including the example sensor 770). In some examples, the response of the sensor is the velocity of the fluid relative to the portion of the downhole tool. In some examples, the response of the sensor is a direction of the fluid flow relative to the portion of the downhole tool. In some such examples, when the direction of the fluid flow relative to the portion of the downhole tool changes, the velocity of the fluid relative to the portion of the downhole tool is substantially zero. In some examples, the sensor can sense fluid flow of a velocity of about 5 millimeters per second or greater. If the velocity of the fluid relative to the portion of the downhole tool is not substantially zero (e.g., the relative fluid velocity is greater than zero, the direction of the fluid flow relative to the portion of the downhole tool has not changed, etc.), the example method 1100 returns to block 1106. If the velocity of the fluid relative to the portion of the downhole tool is substantially zero, the velocity of the fluid is determined based on the velocity of the portion of the downhole tool (block 1112).

Although only a few example embodiments have been described in detail above, those skilled in the art will readily appreciate that many modifications are possible in the example embodiments without materially departing from this disclosure. Accordingly, such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

The Abstract at the end of this disclosure is provided to comply with 37 C.F.R. § 1.72(b) to allow the reader to quickly ascertain the nature of the technical disclosure. It is submitted with the understanding that it will not be used to interpret or limit the scope or meaning of the claims.

What is claimed is:

1. A method, comprising:
    disposing a downhole tool in a well;
    determining a velocity of a portion of the downhole tool utilizing velocity sensors on the downhole tool;
    determining a response of a fluid sensor disposed on the portion of the downhole tool and immersed in a fluid, the fluid sensor including a resistance temperature detector (RTD), wherein the RTD is utilized as a heater and a temperature sensor in thermal contact with the fluid and flush with an outer surface of the downhole tool; and
    determining a velocity of the fluid based on the determined velocity of the portion of the downhole tool and the determined response of the fluid sensor.

2. The method of claim 1 further comprising determining a direction of flow of the fluid.

3. The method of claim 1 wherein determining the velocity of the fluid comprises determining the velocity of the portion of the downhole tool when a velocity of the fluid relative to the portion of the downhole is substantially zero.

4. The method of claim 1 further comprising moving the portion of the downhole tool in a direction of flow of the fluid.

5. The method of claim 4 wherein moving the portion of the downhole tool comprises accelerating the portion of the downhole tool from a velocity less than the velocity of the fluid to a velocity greater than the velocity of the fluid.

6. The method according to claim 1 wherein the fluid comprises a surfactant.

7. The method according to claim 1 wherein the fluid sensor can sense fluid flow of about five millimeters per second or greater.

8. A method, comprising:
    disposing a downhole tool in a well via a coiled tubing;
    determining a velocity of a portion of the downhole tool with velocity sensors disposed on the downhole tool;
    via a fluid sensor disposed on the downhole tool, determining a direction of fluid flow in a well relative to the portion of the downhole tool moving in the well, the fluid sensor capable of sensing fluid flow of about five millimeters per second or greater and in thermal contact with the fluid flow and flush with an outer surface of the downhole tool and in contact with the fluid; and
    determining a velocity of the fluid based on the direction of the fluid flow relative the portion of the downhole tool.

9. The method of claim 8 wherein determining the velocity of the fluid comprises determining the velocity of the portion of the downhole tool when a velocity of the fluid relative to the portion of the downhole tool is determined to be substantially zero.

10. The method of claim 8 further comprising moving the portion of the downhole tool in a direction of the fluid flow.

11. The method of claim 10 further wherein moving the portion downhole tool comprises accelerating the portion of the downhole tool from a velocity less than the velocity of the fluid to a velocity greater than the velocity of the fluid.

12. The method according to claim 8 wherein the fluid comprises a surfactant.

13. The method according to claim 8 wherein the fluid sensor comprises a resistance temperature detector (RTD) and wherein the RTD is utilized as a heater and a temperature sensor.

14. A method, comprising:
    disposing a downhole tool in a well via a coiled tubing, the downhole tool comprising at least one fluid sensor, the at least one fluid sensor disposed flush with an outer surface of the tool and in thermal contact with a fluid mixture in the well;
    determining a direction of flow of the fluid mixture in a fluid flow passageway of the well;
    moving the coiled tubing and the fluid sensor disposed in the fluid mixture based on the direction of the flow of the fluid mixture;
    determining a velocity of the fluid sensor utilizing a velocity sensor on the tool;
    determining a direction of flow of the fluid mixture relative to the fluid sensor; and
    determining a velocity of the fluid mixture based on the direction of the flow of the fluid mixture relative to the fluid sensor and the velocity of the fluid sensor.

15. The method of claim 14 wherein the fluid mixture comprises fluids of different phases.

16. The method of claim 14 wherein the fluid mixture comprises a surfactant.

17. The method of claim 14 wherein the fluid sensor includes a resistance temperature detector (RTD) and wherein the RTD is utilized as a heater and a temperature sensor.

18. The method according to claim 14 wherein the fluid sensor is capable of sensing fluid flow of about five millimeters per second or greater.

19. The method according to claim 14 wherein moving the fluid sensor comprises accelerating the fluid sensor from a velocity less than the velocity of the fluid mixture to a velocity greater than the velocity of the fluid mixture.

* * * * *